(12) United States Patent
Johnsen

(10) Patent No.: US 11,534,876 B2
(45) Date of Patent: Dec. 27, 2022

(54) MACHINING ASSEMBLY COMPRISING A FIRST AND A SECOND ELECTRIC MOTOR, A DRIVE UNIT AND A FEED MODULE

(71) Applicant: Anders Johnsen, Borlänge (SE)

(72) Inventor: Anders Johnsen, Borlänge (SE)

(*) Notice: Subject to any disclaimer, the term of this patent is extended or adjusted under 35 U.S.C. 154(b) by 596 days.

(21) Appl. No.: 16/496,175

(22) PCT Filed: Mar. 19, 2018

(86) PCT No.: PCT/SE2018/050268
§ 371 (c)(1),
(2) Date: Sep. 20, 2019

(87) PCT Pub. No.: WO2018/174785
PCT Pub. Date: Sep. 27, 2018

(65) Prior Publication Data
US 2020/0158209 A1    May 21, 2020

(30) Foreign Application Priority Data

Mar. 22, 2017   (SE) .................................. 1750343-4

(51) Int. Cl.
*B23Q 5/32*         (2006.01)
*B23B 47/26*        (2006.01)
*B23B 47/00*        (2006.01)
(52) U.S. Cl.
CPC ................ *B23Q 5/32* (2013.01); *B23B 47/00* (2013.01); *B23B 47/26* (2013.01)

(58) Field of Classification Search
CPC ........... B23B 47/00; B23B 47/26; B23Q 5/32; B25H 1/0042
See application file for complete search history.

(56) References Cited

U.S. PATENT DOCUMENTS 2,679,173 A * 5/1954 Hill .......................... F16L 41/04
                                                    408/101
3,412,813 A * 11/1968 Johnson .................. E21B 7/027
                                                    173/141

(Continued)

FOREIGN PATENT DOCUMENTS

JP      2001-129708 A     5/2001
WO         82/00863 A1    3/1982
(Continued)

*Primary Examiner* — Nicole N Ramos
(74) *Attorney, Agent, or Firm* — Dilworth & Barrese, LLP

(57) ABSTRACT

A machining assembly with a drive unit (10) detachably mountable to the feed module (30) and moveable along a guide track on a machine stand via the feed module. The feed module is provided with a feed gear wheel (33) configured for engagement with a cog track on the machine stand. An electric drive motor (12) for rotating a spindle (13) and an electric feed motor (16) for rotating the feed gear wheel are arranged in a housing (11) of the drive unit. The drive unit comprises a drive member, which is rotatable by the feed motor and which is operatively connectable to the feed gear wheel via a torque transmitting coupling mechanism (50) when the drive unit is mounted to the feed module so as to allow the feed gear wheel to be rotated under the effect of the feed motor when the drive unit is mounted to the feed module.

20 Claims, 12 Drawing Sheets

(56) References Cited

U.S. PATENT DOCUMENTS

| | | | | |
|---|---|---|---|---|
| 4,688,970 A | * | 8/1987 | Eckman | G05B 19/4163 |
| | | | | 408/137 |
| 6,692,201 B2 | * | 2/2004 | Soderman | B25H 1/0064 |
| | | | | 408/712 |
| 8,888,417 B2 | * | 11/2014 | Jonsson | B25H 1/0064 |
| | | | | 408/8 |
| 2007/0217879 A1 | * | 9/2007 | Larsson | B28D 7/005 |
| | | | | 408/129 |
| 2010/0290848 A1 | * | 11/2010 | Baratta | F16C 29/045 |
| | | | | 408/129 |
| 2010/0327241 A1 | * | 12/2010 | Johnsen | B25H 1/0042 |
| | | | | 254/85 |
| 2013/0025390 A1 | * | 1/2013 | Johnsen | B23Q 5/046 |
| | | | | 74/380 |
| 2019/0093738 A1 | * | 3/2019 | Almqvist | F16H 3/083 |

FOREIGN PATENT DOCUMENTS

| | | | | |
|---|---|---|---|---|
| WO | 2005/095075 A1 | | 10/2005 | |
| WO | 2008/026974 A1 | | 3/2008 | |
| WO | WO-2008130304 A1 | * | 10/2008 | ........... B25H 1/0064 |
| WO | 2011/129733 A1 | | 10/2011 | |
| WO | 2011/129751 A1 | | 10/2011 | |

\* cited by examiner

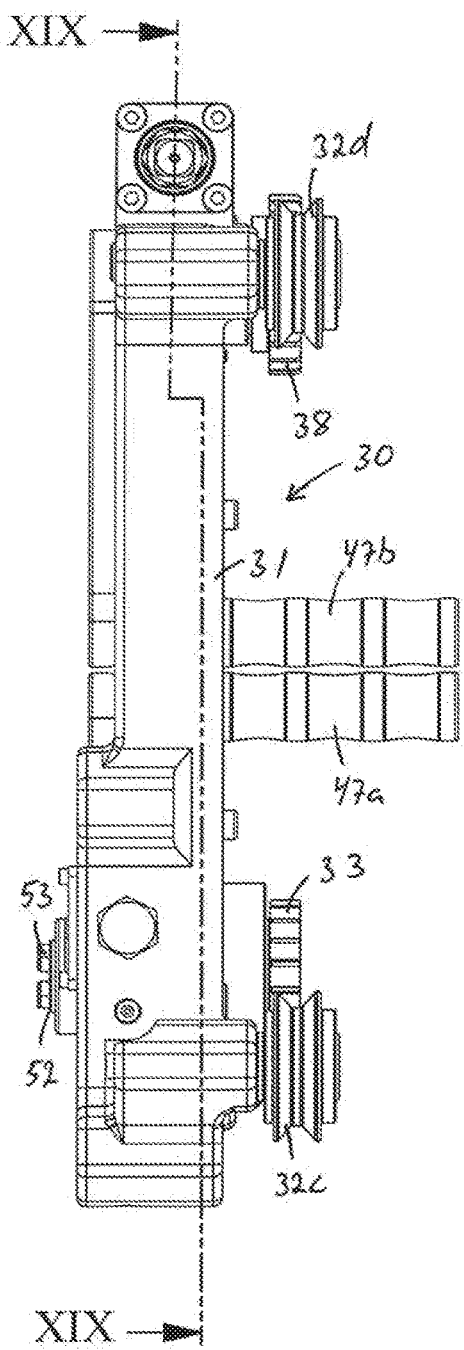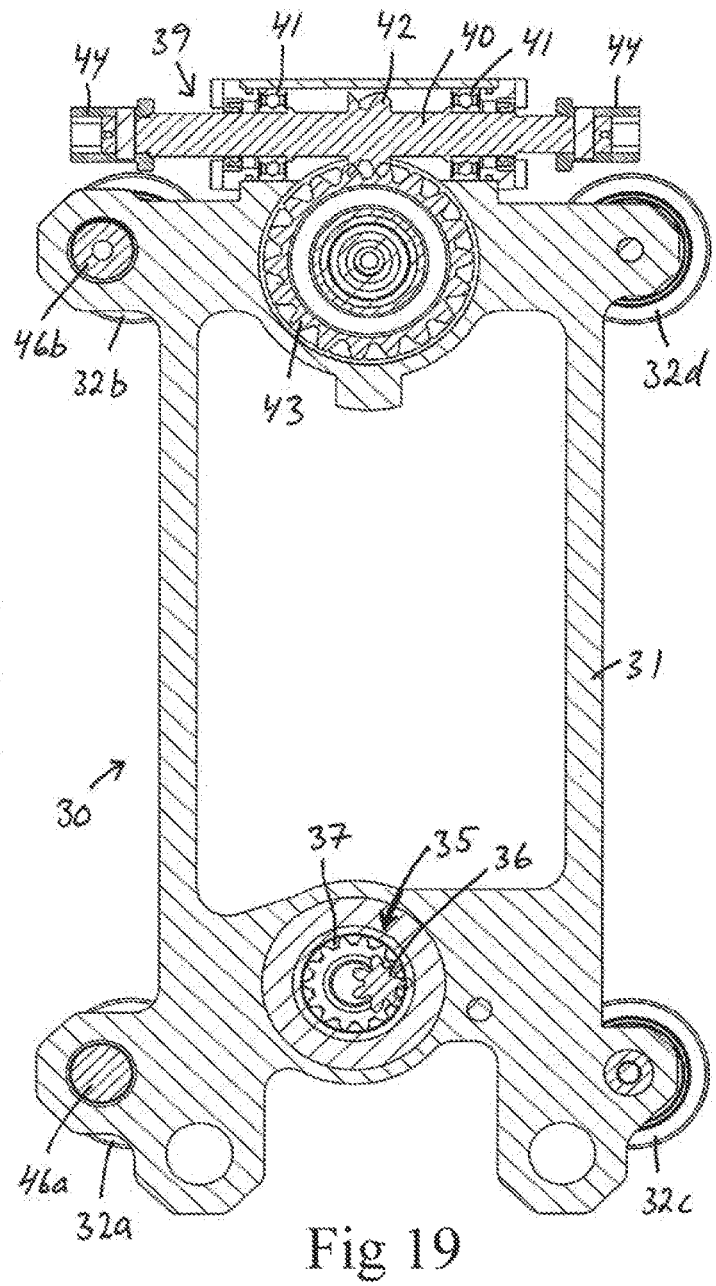
Fig 18
Fig 19

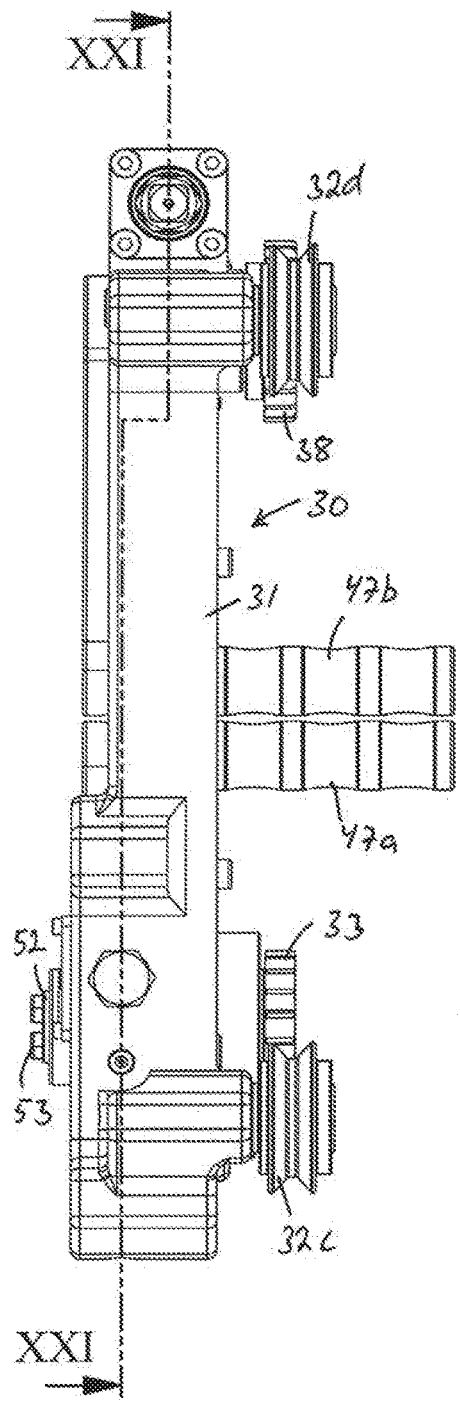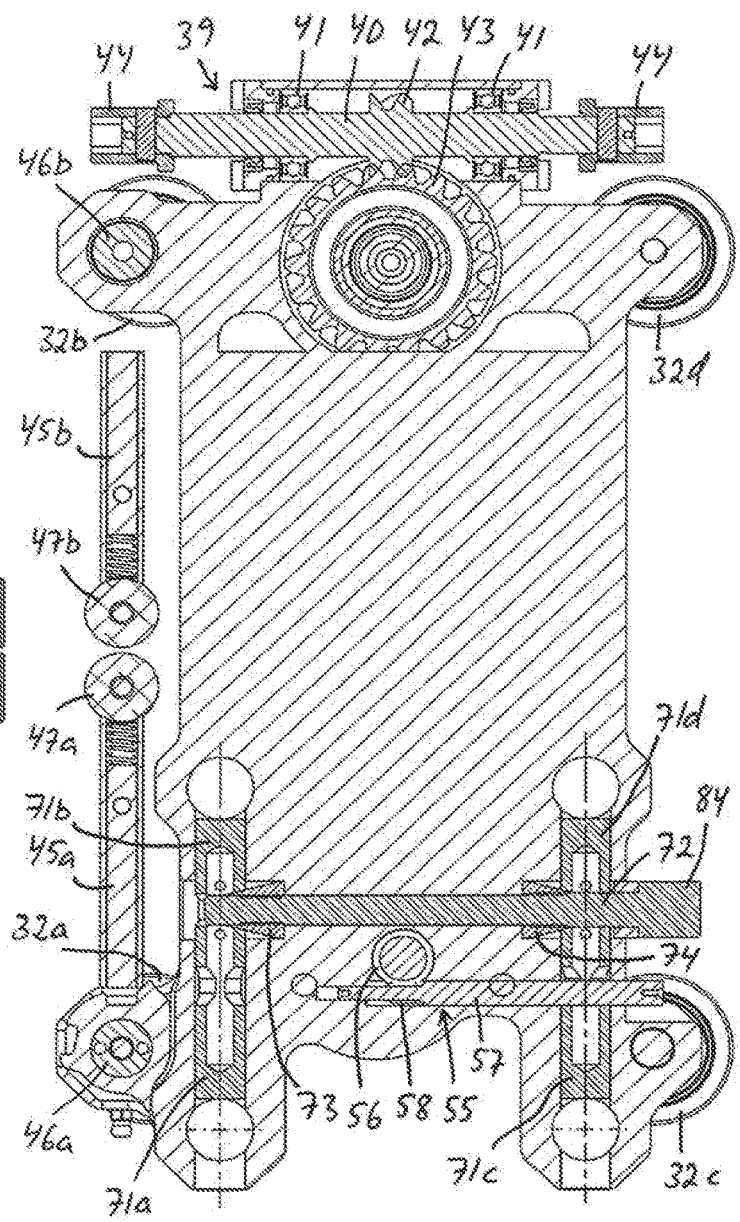
Fig 20
Fig 21

MACHINING ASSEMBLY COMPRISING A FIRST AND A SECOND ELECTRIC MOTOR, A DRIVE UNIT AND A FEED MODULE

FIELD OF THE INVENTION AND PRIOR ART

The present invention relates to a machining assembly according to the description herein.

For making of holes in for instance concrete or other hard materials, it is known to use a machining assembly with a drilling tool driven by a drive motor where the drive motor is arranged in a drive unit carried by a machine stand. Such a machining assembly is for instance previously known from WO 82/00863 A1. In the machining assembly disclosed in WO 82/00863 A1, the drive unit is connected to a feed unit, by means of which the drive unit is displaceable along a column included in the machine stand. The drilling tool may for instance consist of a hollow cylindrical drill bit, which at one end is attached to a spindle driven by the drive motor and which at its other end is provided with machining bodies with cutting edges of diamond, wherein the machining bodies are fixed to the outer annular edge of the drill bit. When a hole is to be made in a construction member, such as a joist or a wall, the drive unit is fed along the column in the direction towards the construction member, wherein the drill bit works its way into the construction member and cuts out a cylindrical body from the construction member while leaving a corresponding cylindrical hole therein.

The feed unit of the machining assembly disclosed in WO 82/00863 A1 is provided with a rotatable feed gear wheel which is in engagement with a cog track on the machine stand, wherein the feed gear wheel is configured to be manually rotated in order to manually move the feed unit along the machine stand.

It is also previously known that a feed unit for use with a drive unit of a machining assembly of the above-mentioned type may be provided with a feed motor for automatic movement of the feed unit along the machine stand.

OBJECT OF THE INVENTION

The object of the present invention is to provide a machining assembly of the type mentioned by way of introduction with a new and favourable design.

SUMMARY OF THE INVENTION

According to the present invention, said object is achieved by means of a machining assembly having the features defined herein.

The machining assembly according to the invention comprises a drive unit, a feed module and a machine stand for supporting the feed module and the drive unit, the drive unit being detachably mountable to the feed module in order to allow the drive unit to be moved along a guide track on the machine stand via the feed module.

The drive unit of the machining assembly comprises:
a drive unit housing;
a first electric motor arranged in the drive unit housing;
a spindle configured for connection to a machining tool, the spindle being rotatably mounted to the drive unit housing;
a first transmission mechanism arranged in the drive unit housing for transmitting torque from the first electric motor to the spindle so as to allow the spindle to be rotated under the effect of the first electric motor;
a second electric motor arranged in the drive unit housing;
a drive member rotatably mounted to the drive unit housing; and
a second transmission mechanism arranged in the drive unit housing for transmitting torque from the second electric motor to the drive member so as to allow the drive member to be rotated under the effect of the second electric motor.

The feed module of the machining assembly comprises:
a feed module housing;
guide members, which are mounted to the feed module housing and configured for engagement with said guide track;
a feed gear wheel, which is rotatably mounted to the feed module housing and configured for engagement with a cog track arranged on the machine stand in parallel with said guide track in order to allow the feed module to move along the guide track by rotation of the feed gear wheel; and
a rotatable member, which is rotatably mounted to the feed module housing and configured to be connected to said drive member of the drive unit by a torque transmitting coupling mechanism when the drive unit is mounted to the feed module, wherein the rotatable member is operatively connected to the feed gear wheel so as to allow torque to be transmitted from the second electric motor to the feed gear wheel via the drive member of the drive unit and the rotatable member of the feed module, and thereby allow the feed gear wheel to be rotated under the effect of the second electric motor, when the drive unit is mounted to the feed module.

The first electric motor arranged in the drive unit housing constitutes a drive motor for rotating a tool connected to the spindle, whereas the second electric motor arranged in the drive unit housing constitutes a feed motor for automatically moving the drive unit and the feed module along the machine stand. By having the feed motor arranged in the drive unit housing, no electric cables or electric equipment need to be included in the feed module, which simplifies the construction of the feed module. Furthermore, by arranging the drive motor and the feed motor in the same housing, i.e. in the drive unit housing, the overall weight and size of the machining assembly may be reduced as compared to the case when the drive motor and the feed motor are arranged in two separate housings.

Further advantageous features of the machining assembly according to the present invention will appear from the description following below.

BRIEF DESCRIPTION OF THE DRAWINGS

The invention will in the following be more closely described by means of embodiment examples, with reference to the appended drawings. In the drawings:

FIG. 18 is a lateral view of the feed module, FIG. 19 is a cut according to the line XIX-XIX in FIG. 18, FIG. 20 is a lateral view of the feed module, FIG. 21 is a cut according to the line XXI-XXI in FIG. 20, as seen with locking elements included in the feed module in an unlocking position.

DETAILED DESCRIPTION OF EMBODIMENTS OF THE INVENTION

Figure 1A:
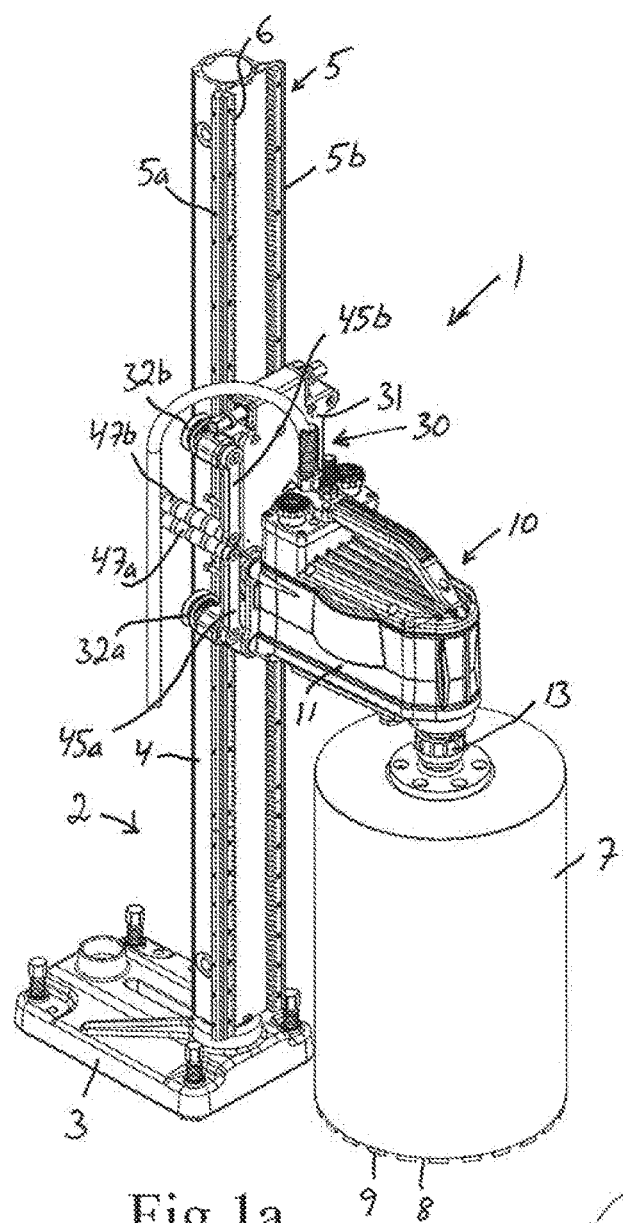
FIGS. 1a and 1b are perspective views from different directions of a machining assembly according to an embodiment of the present invention.
Figure 1B:
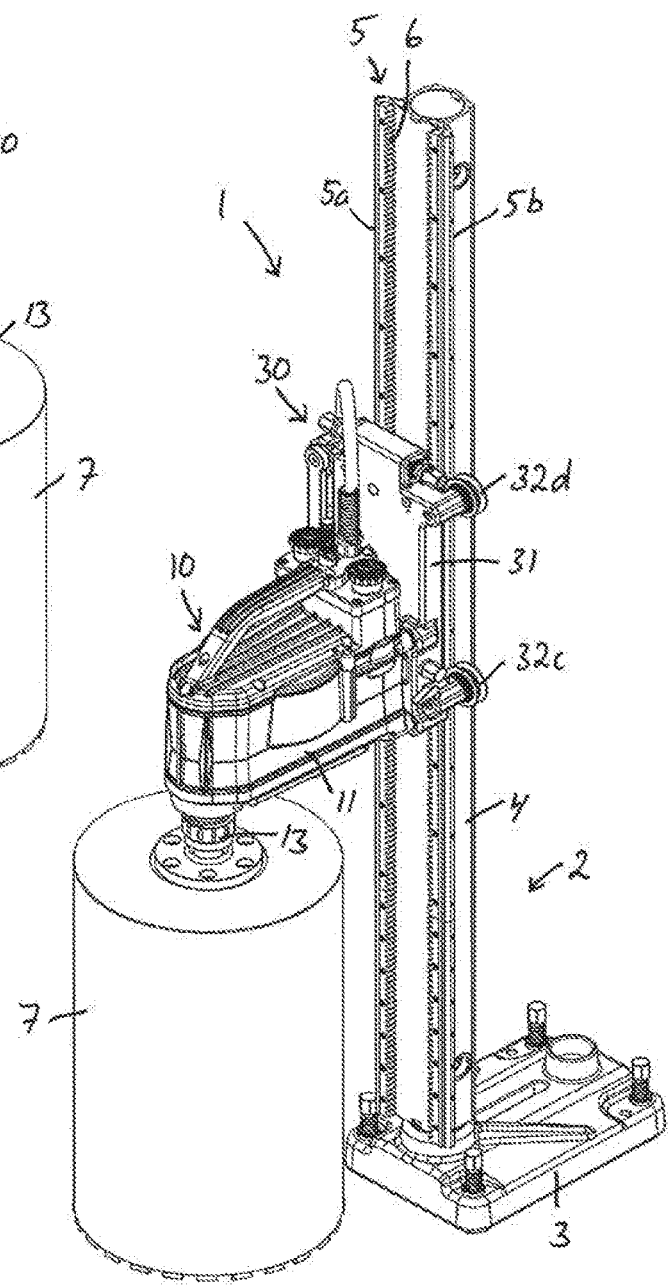

FIG. 1 shows a machining assembly 1 according to an embodiment of the present invention. This machining assembly 1 comprises a drive unit 10, a feed module 30 and a machine stand 2 for supporting the feed module and the drive unit.

In the illustrated embodiment, the machine stand 2 comprises a base plate 3, through which the machine stand is intended to rest against a supporting surface, and an elongated column 4 which is attached to and projects from the base plate 3. The column 4 is with advantage pivotally mounted to the base plate 3 in order to allow an adjustment of the inclination of the column in relation to the base plate. A guide track 5 extends along the column 4. In the illustrated example, this guide track 5 is formed by two elongated guide track elements 5a, 5b which are arranged in parallel with and at a distance from each other. A cog track 6 extends along the column 4 in parallel with the guide track 5.

The drive unit 10 is detachably mountable to the feed module 30 in order to allow the drive unit to be moved along the guide track 5 on the machine stand 2 via the feed module.

Figure 6:
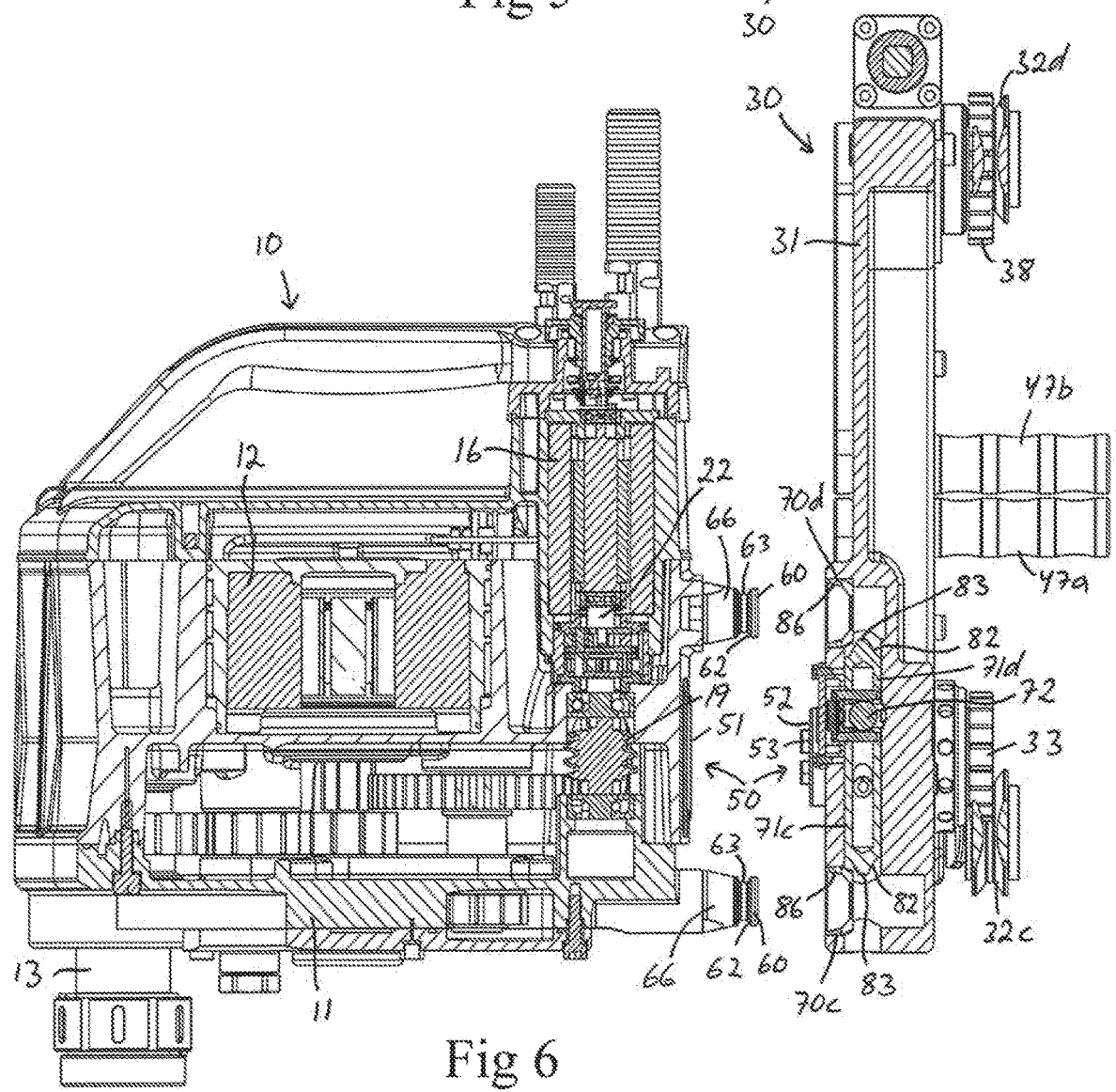
FIG. 6 is a cut according to the line VI-VI in FIG. 5.
Figure 7:
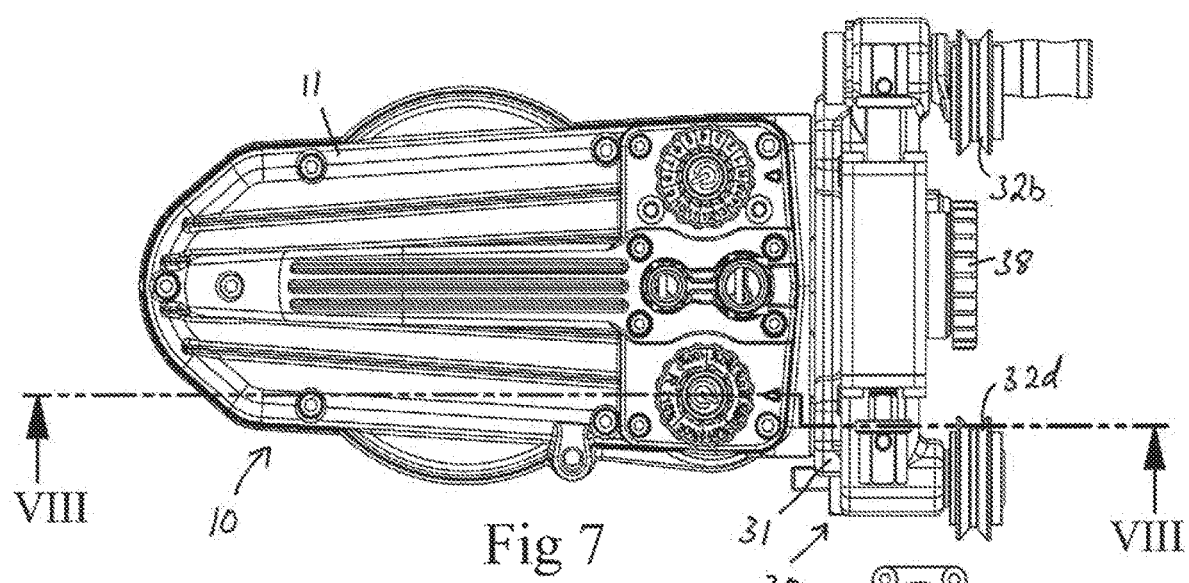
FIG. 7 is a planar view from above of the drive unit and the feed module, as seen with the drive unit mounted to the feed module.
Figure 8:
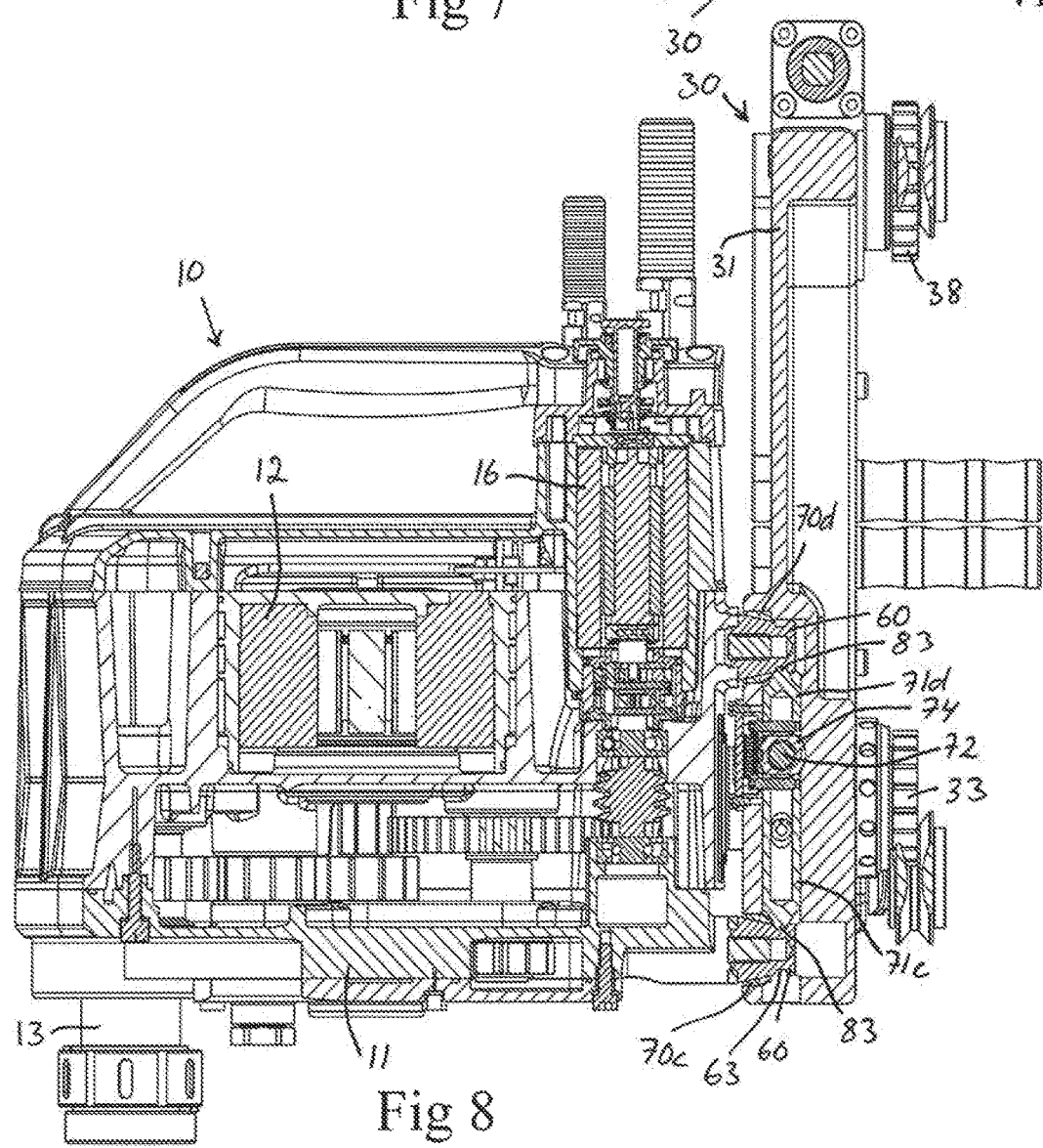
FIG. 8 is a cut according to the line VIII-VIII in FIG. 7.
Figure 9:
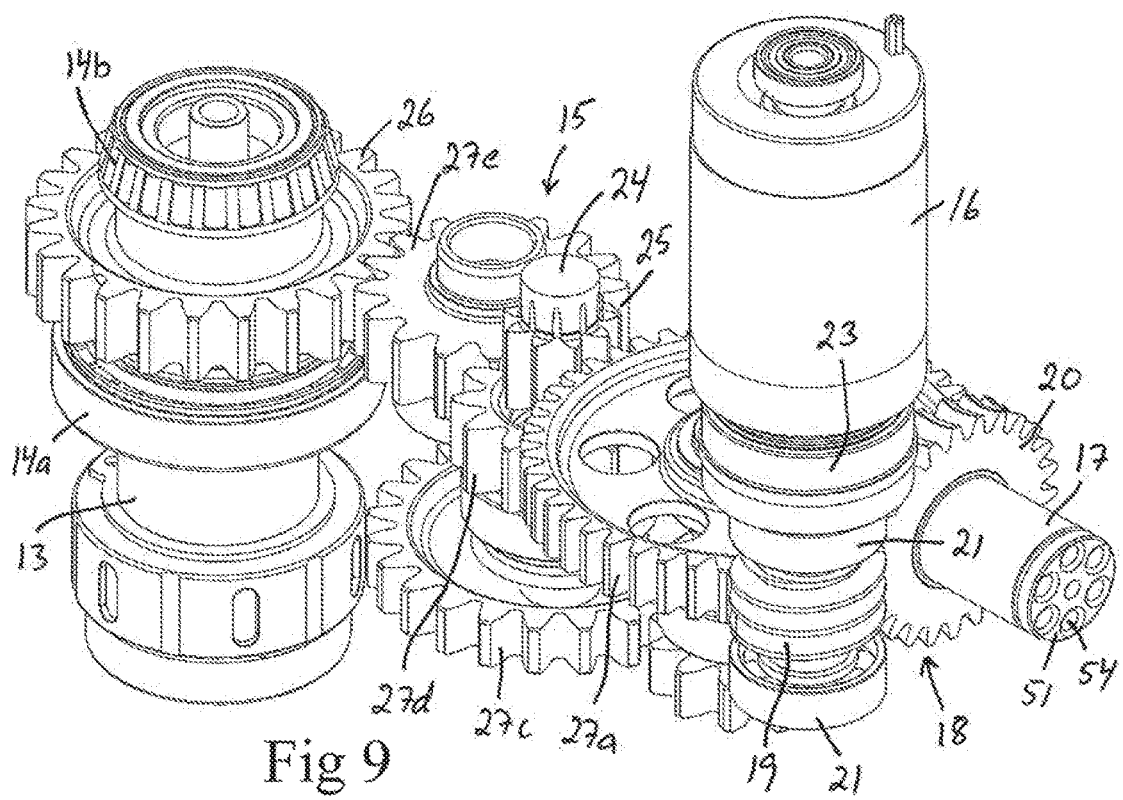
FIG. 9 is a perspective view of two transmission mechanisms included in the drive unit.

The drive unit 10 comprises:
- a housing 11, in the following denominated drive unit housing;
- a first electric motor 12 (see FIGS. 6 and 8), in the following denominated drive motor, arranged in the drive unit housing 11;
- a spindle 13 which is rotatable by the drive motor 12 and configured for connection to a machining tool, the spindle 13 being rotatably mounted to the drive unit housing 11 by means of suitable bearings 14a, 14b (see FIGS. 9 and 12);
- a first transmission mechanism 15 arranged in the drive unit housing 11 for transmitting torque from the drive motor 12 to the spindle 13 so as to allow the spindle to be rotated under the effect of the drive motor 12;
- a second electric motor 16, in the following denominated feed motor, arranged in the drive unit housing 11;
- a drive member 17 which is rotatable by the feed motor 16 and rotatably mounted to the drive unit housing 11; and
- a second transmission mechanism 18 arranged in the drive unit housing 11 for transmitting torque from the feed motor 16 to the drive member 17 so as to allow the drive member to be rotated under the effect of the feed motor 16.

Thus, the drive motor 12 and the feed motor 16 are both arranged in the drive unit housing 11, which consequently forms a motor housing for both motors 12, 16.

Any desired type of machining tool may be detachably attached to the spindle 13 by means of a suitable coupling, for instance a coupling of the type described in closer detail in WO 2011/129751 A1, in order to allow the machining tool to be rotated under the effect of the drive motor 12. In the example illustrated in FIGS. 1a and 1b, the machining tool 7 consists of a drilling tool in the form of a cylindrical drill bit, which at an outer ring-shaped edge 8 is provided with machining bodies 9 with cutting edges of diamond. This type of drilling tool is intended to be used for making of holes in concrete or other hard materials. Also other types of drilling tools or machining tools for another type of machining than making of holes may be attached to spindle 13.

Figure 4:
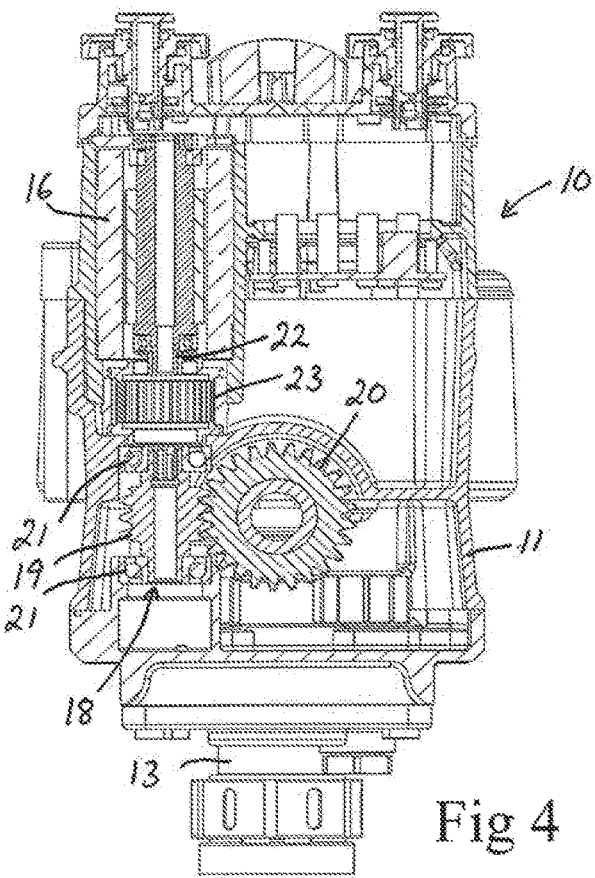
FIG. 4 is a cut according to the line IV-IV in FIG. 3.
Figure 5:
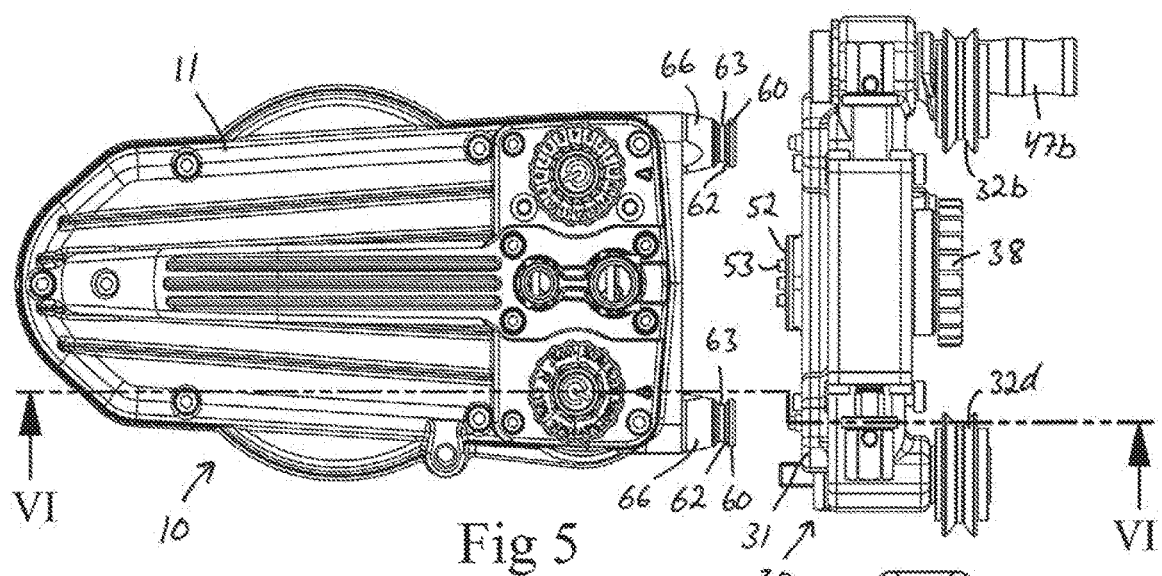
FIG. 5 is a planar view from above of a drive unit and a feed module included in the machining assembly of FIG. 1, as seen with the drive unit disconnected from the feed module.

In the illustrated embodiment, the second transmission mechanism 18 comprises a worm gear arrangement with a worm screw 19 and a worm wheel 20, wherein the worm screw 19 is rotatably mounted to the drive module housing 11 by means of suitable bearings 21 and operatively connected to the output shaft 22 (see FIGS. 4 and 6) of the feed motor 16 via a reduction gear 23, preferably in the form of a planetary gear, so as to allow the worm screw 19 to be driven in rotation by the feed motor 16. The worm wheel 20 is in engagement with the worm screw 19 and non-rotatably connected to the drive member 17.

Figure 10:
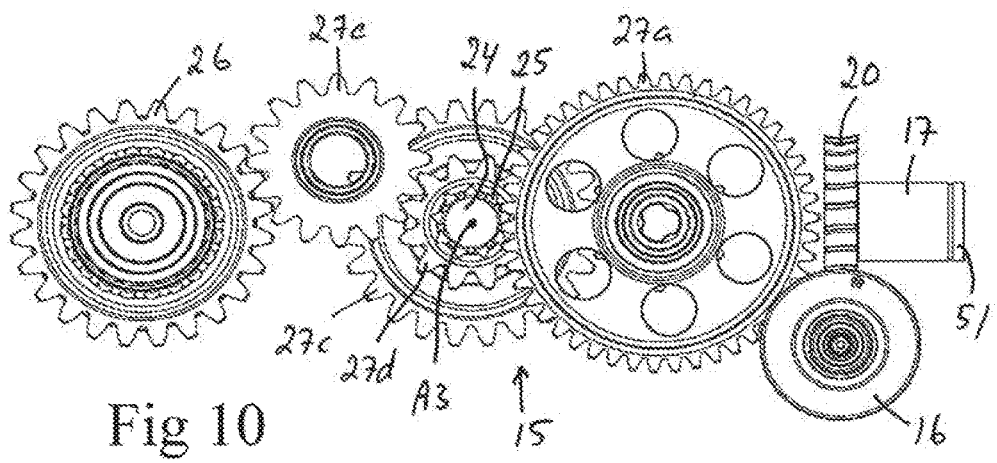
FIG. 10 is a planar view from above of the transmission mechanisms of FIG. 9.
Figure 11:
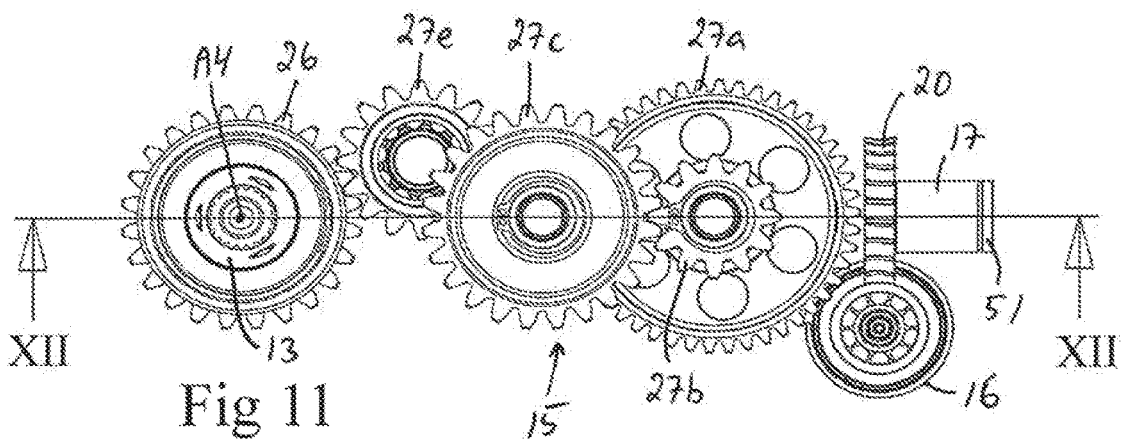
FIG. 11 is a planar view from below of the transmission mechanisms of FIG. 9.
Figure 12:
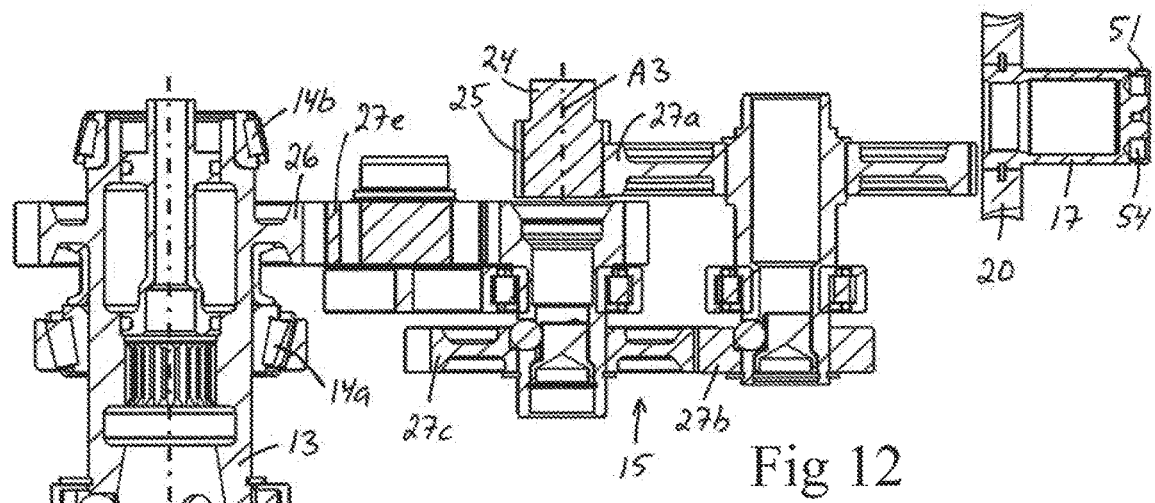
FIG. 12 is a cut according to the line XII-XII in FIG. 11, FIGS. 13 and 14 are perspective views from different directions of the feed module.

In the illustrated embodiment, the output shaft 24 (see FIGS. 9, 10 and 12) of the drive motor 12 is rotatable about an axis of rotation A3, here denominated third axis of rotation, and the spindle 13 is rotatable about another axis of rotation A4 (see FIGS. 11 and 12), here denominated fourth axis of rotation, which extends in parallel with the third axis of rotation A3. The first transmission mechanism 15 comprises a first gear wheel 25 which is non-rotatably fixed to the output shaft 24 of the drive motor and a second gear wheel 26 which is non-rotatably fixed to the spindle 13. The first gear wheel 25 and the output shaft 24 of the drive motor are suitably formed in one piece, and the second gear wheel 26 and the spindle 13 are suitably formed in one piece, as illustrated in FIG. 12. In the illustrated example, the first gear wheel 25 is drivingly connected to the second gear wheel 26 via several intermediate gear wheels 27a-27e so that the spindle 13 via these gear wheels 25, 27a-27e, 26 is made to rotate about the fourth axis of rotation A4 when the output shaft 24 of the drive motor is rotated about the third axis of rotation A3. The intermediate gear wheels 27a-27e are rotatably mounted to the drive unit housing 11 by means of suitable bearings. As an alternative, the first gear wheel 25 could be directly engaged with the second gear wheel 26, without any intermediate gear wheels.

By a suitable design of the gear wheels of the first transmission mechanism 15, the gear ratio between the output shaft 24 of the drive motor 12 and the spindle 13 and thereby the rotational speed of a machining tool 7 attached to the spindle can be adjusted as needed.

The feed module 30 comprises:

- a housing 31, in the following denominated feed module housing;
- guide members 32a-32d, which are mounted to the feed module housing 31 and configured for engagement with the guide track 5 on the machine stand 2;
- a feed gear wheel 33, here denominated first feed gear wheel, which is rotatably mounted to the feed module housing 31 and configured for engagement with the cog track 6 on the machine stand 2 in order to allow the feed module 30 to move along the guide track 5 by rotation of the first feed gear wheel 33;
- a rotatable member 34, which is rotatably mounted to the feed module housing 31 and configured to be connected to the drive member 17 of the drive unit 10 by a torque transmitting coupling mechanism 50 (see FIG. 6) when the drive unit 10 is mounted to the feed module 30.

The rotatable member 34 of the feed module 30 is operatively connected to the first feed gear wheel 33 so as to allow torque to be transmitted from the feed motor 16 to the first feed gear wheel 33 via the drive member 17 of the drive unit 10 and the rotatable member 34 of the feed module 30, and thereby allow the first feed gear wheel 33 to be rotated under the effect of the feed motor 16, when the drive unit 10 is mounted to the feed module 30.

Figure 17:
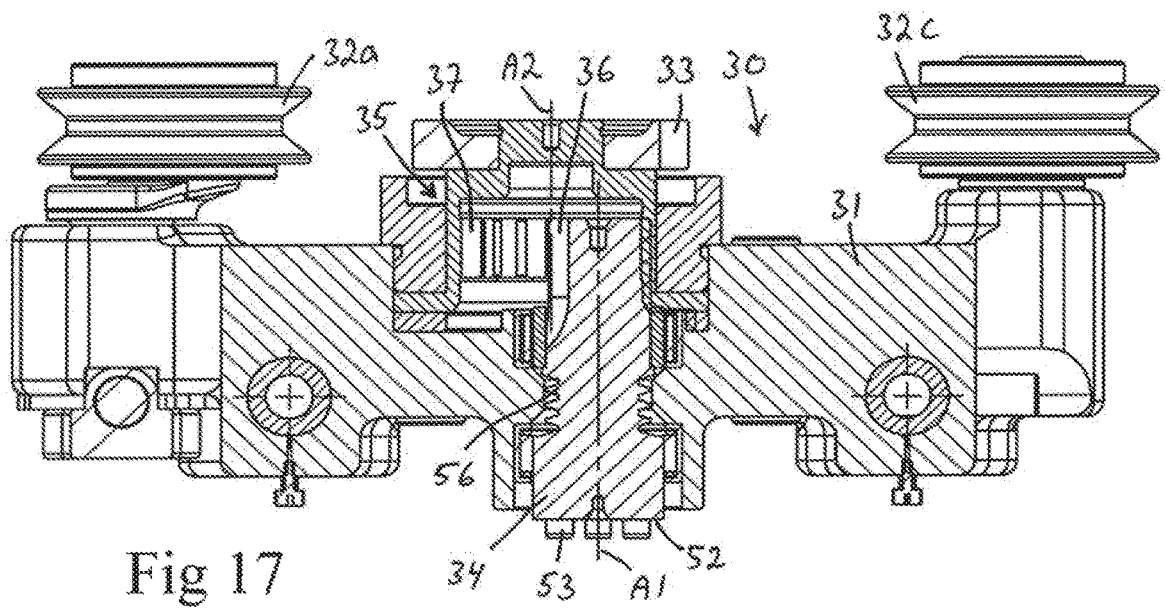
FIG. 17 is a cut according to the line XVII-XVII in FIG. 16.

In the illustrated embodiment, the feed module 30 comprises a transmission mechanism 35 (see FIGS. 17, 19 and 25), here denominated third transmission mechanism, for transmitting torque from the above-mentioned rotatable member 34 to the first feed gear wheel 33. In this case, the rotatable member 34 is rotatable about a first axis of rotation A1 (see FIG. 17) and the first feed gear wheel 33 is rotatable about a second axis of rotation A2 which extends in parallel with the first axis of rotation A1. As an alternative, the first feed gear wheel 33 may be non-rotatably connected to the rotatable member 34, for instance by being fixed to the same shaft as the rotatable member.

The third transmission mechanism 35 is arranged in the feed module housing 31 and comprises a first gear wheel 36 (see FIGS. 17 and 19) which is non-rotatably connected to the rotatable member 34 and a second gear wheel 37 which is non-rotatably connected to the first feed gear wheel 33. The first gear wheel 36 and the rotatable member 34 are with advantage formed in one piece. In the illustrated example, the first gear wheel 36 directly engages with the second gear wheel 37 so that the first feed gear wheel 33 via these gear wheels 36, 37 is made to rotate about the second axis of rotation A2 when the rotatable member 34 is rotated about the first axis of rotation A1. As an alternative, the first gear wheel 36 could be in driving engagement with the second gear wheel 37 via one or more intermediate gear wheels. In the illustrated example, the second gear wheel 37 is an internally toothed ring gear, whereas the first gear wheel 36 is an externally toothed gear wheel.

In the illustrated embodiment, the feed module 30 also comprises a second feed gear wheel 38, which is rotatably mounted to the feed module housing 31 and configured for engagement with the cog track 6 on the machine stand 2 in order to allow the feed module 30 to move along the guide track 5 by rotation of the second feed gear wheel 38. In this case, the feed module 30 also comprises a manually operated drive mechanism 39 which is operatively connected to the second feed gear wheel 38 so as to allow torque to be transmitted from the manually operated drive mechanism 39 to the second feed gear wheel 38 and thereby allow the second feed gear wheel to be rotated under the effect of the manually operated drive mechanism. In the illustrated example, the manually operated drive mechanism 39 comprises a drive shaft 40 rotatably mounted to the feed module housing 31 by means of suitable bearings 41 and a helical gear wheel 42 non-rotatably fixed to the drive shaft 40. The helical gear wheel 42 and the drive shaft 40 are with advantage formed in one piece. The helical gear wheel 42 on the drive shaft 40 is in engagement with a corresponding helical gear wheel 43, which is non-rotatably connected to the second feed gear wheel 38. A socket 44 designed for releasable engagement with a torque tool (not shown) is fixed to the drive shaft 40 at each end thereof so as to allow a torque tool, for instance in the form of a box spanner or the similar, to be connected to the drive shaft 40 when the feed module 30 is to be manually moved along the guide track 5.

Figure 22:
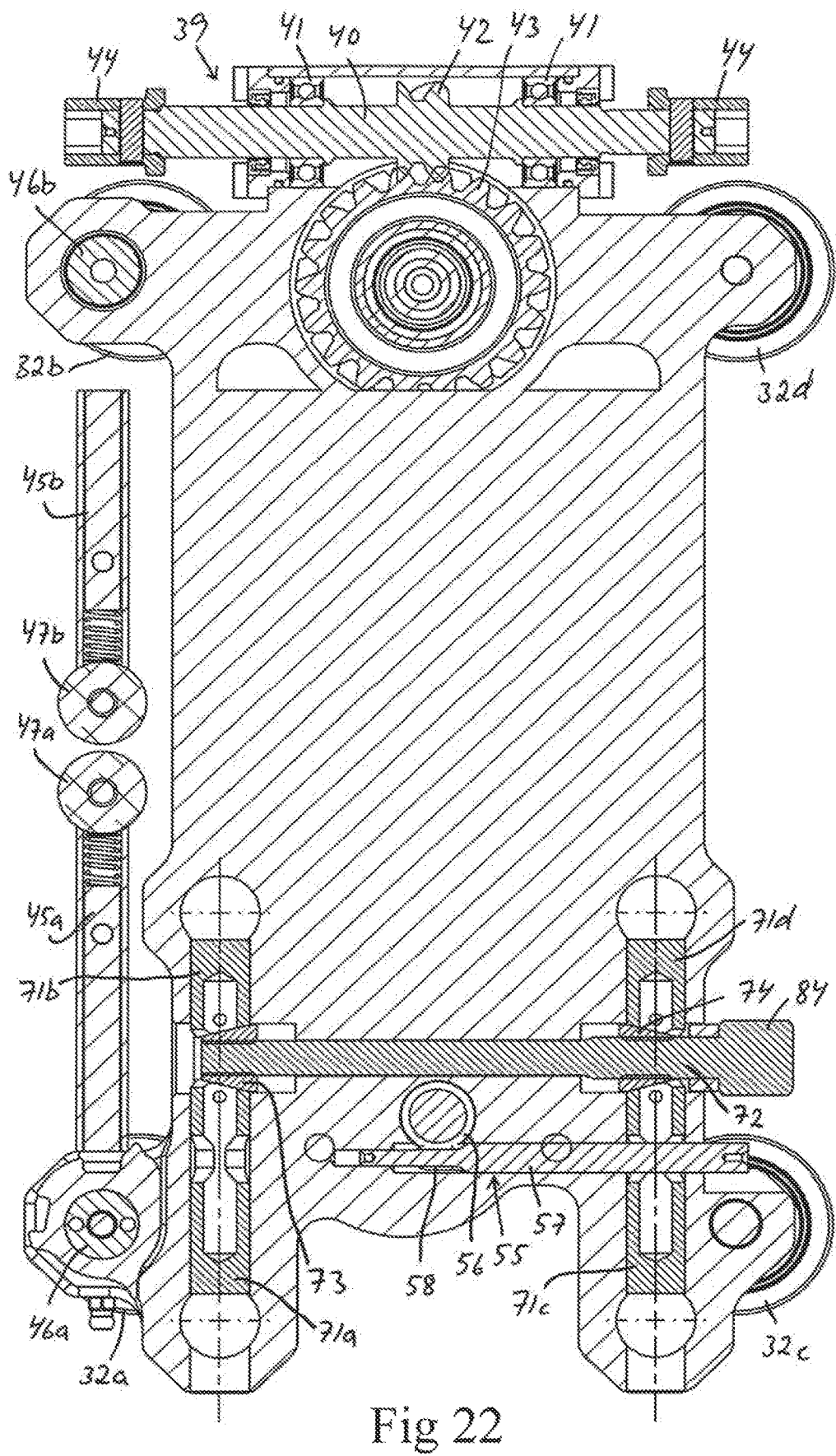
FIG. 22 is a cut according to the line XXI-XXI in FIG. 20, as seen with the locking elements in a locking position.

The above-mentioned guide members 32a-32d have the form of rotatable rollers or wheels rotatably mounted to the feed module housing 31. The guide members 32a-32d are in engagement with the guide track elements 5a, 5b of the guide track 5 and are arranged to keep the drive unit 10 and the feed module 30 in place on the column 4, while allowing the drive unit 10 and the feed module 30 to move along the column 4 in the longitudinal direction thereof. In the illustrated embodiment, two guide members 32a, 32b are arranged on a first side of the feed module housing 31 and configured for engagement with a first one 5a of the guide track elements and two other guide members 32c, 32d are arranged on an opposite second side of the feed module housing 31 and configured for engagement with the other guide track element 5b. In order to facilitate the mounting of the feed module 30 to the guide track 5, the guide members 32a, 32b on the first side of the feed module housing 31 are laterally moveable in relation to the feed module housing 31 by means of a respective lever 45a, 45b, wherein these guide members 32a, 32b are eccentrically connected to a respective shaft 46a, 46b (see FIGS. 19 and 22), which in its turn is rotatably mounted to the feed module housing 31 and connected to a handle 47a, 47b via the associated lever 45a, 45b. When the feed module 30 is to be mounted to the guide track 5, the levers 45a, 45b are pivoted outwards from the feed module housing 31 in order to move the guide members 32a, 32b on the first side of the feed module housing laterally away from the guide members 32c, 32d on the second side of the feed module housing 31. Thereafter, when the feed module housing 31 has been positioned on the guide track 5 with the guide members 32c, 32d on the second side of the feed module housing 31 in contact with one of the guide track elements 5b, the levers 45a, 45b are pivoted towards the feed module housing 31 into the positions illustrated in FIGS. 13 and 16 so as to thereby move the guide members 32a, 32b on the first side of the feed module housing 31 laterally towards the guide members 32c, 32d on the second side of the feed module housing 31 and into contact with the other guide track element 5a. When so needed, the laterally moveable guide members 32a, 32b may be moved away from the associated guide track element 5a by pivoting the levers 45a, 45b, in order to allow the feed module 30 to be released from the guide track 5. When the feed module 30 is properly mounted to the guide track 5 with the guide members 32a-32d in engagement with the guide track elements 5a, 5b, the first and second feed gear wheels 33, 38 are in engagement with the cog track 6 and the feed module 30 is thereby automatically moveable along the guide track 5 by rotation of the first feed gear wheel 33 under the effect of the feed motor 15 and manually moveable along the guide track 5 by manual rotation of the second feed gear wheel 38.

The above-mentioned torque transmitting coupling mechanism 50 suitably has the form of a clutch with a first clutch part 51 (see FIGS. 2, 6 and 9) non-rotatably connected to the drive member 17 of the drive unit 10 and a second clutch part 52 (see FIGS. 5, 6, 13 and 25) non-rotatably connected to the rotatable member 34 of the feed module 30. The first and second clutch parts 51, 52 are engageable with each other when the drive unit 10 is mounted to the feed module 30 in order to allow torque to be transmitted from the drive member 17 to the rotatable member 34 via the clutch parts 51, 52. In the illustrated example, the second clutch part 52 is provided with protruding pegs 53 which are configured for engagement with corresponding recesses 54 in the first clutch part 51. As an alternative, the first clutch part 51 could be provided with protruding pegs configured for engagement with corresponding recesses in the second clutch part 52. As a further alternative, the torque transmitting coupling mechanism 50 could have the form of a dog clutch. The torque transmitting coupling mechanism 50 may of course also have any other suitable design.

In the illustrated embodiment, the second clutch part 52 is axially moveable in relation to the feed module housing 31 between an advanced position, in which the second clutch part 52 is in torque-transmitting engagement with the first clutch part 51, and a retracted position, in which the second clutch part 52 is disengaged from the first clutch part 51. The feed module 30 is provided with a manually manoeuvrable manoeuvring member 55 (see FIGS. 22 and 25) for moving the second clutch part 52 between the advanced and retracted positions. In the illustrated example, a clutch manoeuvring worm screw 56 is non-rotatably connected to the second clutch part 52, and the manoeuvring member 55 comprises a shaft 57 which is rotatably mounted to the feed module housing 31 so as to be manually rotatable, wherein the shaft 57 is provided with a worm gear 58 which is in engagement with the clutch manoeuvring worm screw 56 so as to allow the second clutch part 52 to be moved from the advanced position to the retracted positions by rotation of the shaft 57 in a first rotary direction and from the retracted position to the advanced position by rotation of the shaft 57 in an opposite rotary direction. In the illustrated embodiment, the shaft 57 is rotatable by means of an operating lever 59 (see FIGS. 13 and 14) which is fixed to the shaft 57 at one end thereof. As an alternative, the shaft 57 may at one end be provided with a tool fitting designed for detachable engagement with a tool to be used for rotating the shaft 57 in order to move the second clutch part 52 between the advanced and retracted positions. When the drive unit 10 and the feed module 30 are to be manually moved along the guide track 5 by manual rotation of the second feed gear wheel 38 via the manually operated drive mechanism 39, the second clutch part 52 is moved into the retracted position in order to disconnect the first feed gear wheel 33 from the second transmission mechanism 18 and the feed motor 16 and thereby facilitate the manual movement of the feed module 30 along the guide track 5.

In the illustrated embodiment, the above-mentioned first gear wheel 36 of the third transmission mechanism 35 is fixedly connected to the second clutch part 52 and the clutch manoeuvring worm screw 56 and configured to move axially together with the second clutch part 52 and the clutch manoeuvring worm screw 56 when the second clutch part 52 is moved between the advanced and retracted positions. To make this possible, this first gear wheel 36 is axially slidable in relation to the second gear wheel 37 of the third transmission mechanism 35.

Figure 23:
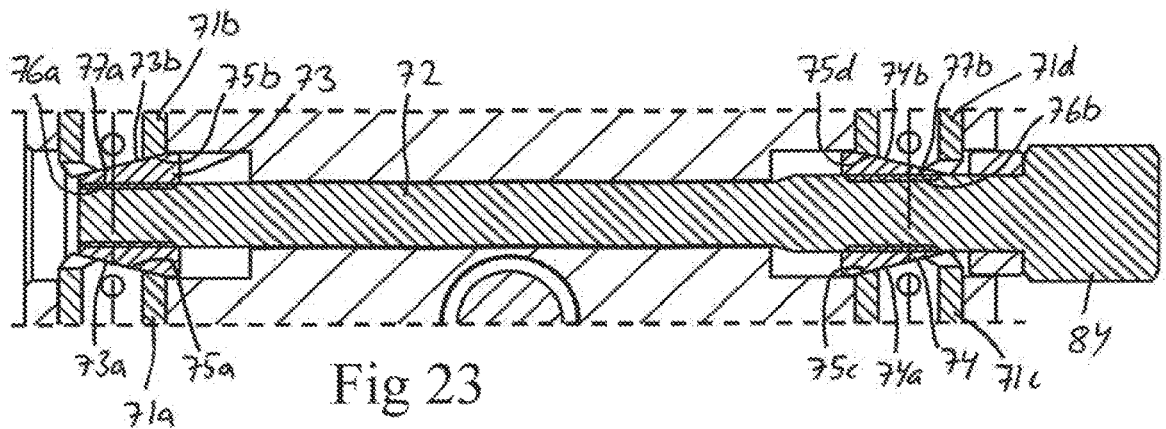
FIG. 23 is a detail enlargement from FIG. 22.
Figure 24:
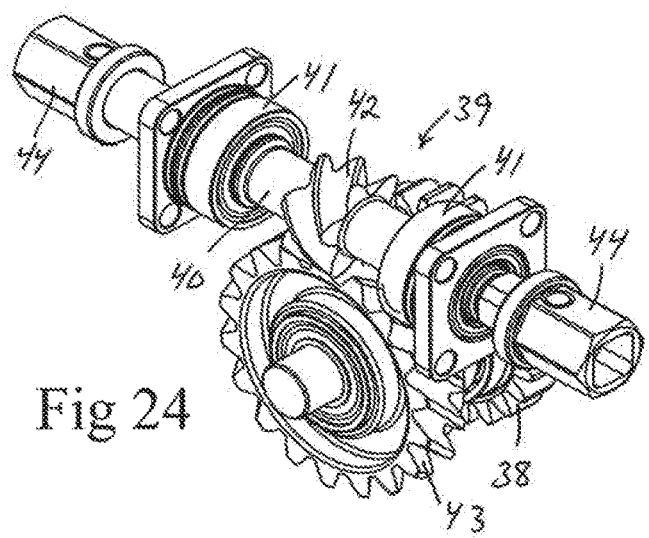
FIG. 24 is a perspective view of the manually operated drive mechanism.

The drive unit 10 is detachably securable to the feed module 30 by means of a coupling device, which in the illustrated embodiment comprises:

four male-shaped coupling members 60 fixed to the drive unit housing 11;

four female-shaped coupling members 70a-70d fixed to the feed module housing 31 and configured for engagement with a respective one of the male-shaped coupling members 60;

first and second locking elements 71a, 71b (see FIGS. 21, 22 and 25) moveably mounted to the feed module housing 31 and forming a first pair of locking elements, wherein the first locking element 71a is moveable into locking engagement with a male-shaped coupling member 60 received in a first female-shaped coupling member 70a and the second locking element 71b is moveable into locking engagement with a male-shaped coupling member 60 received in a second female-shaped coupling member 70b;

third and fourth locking elements 71c, 71d moveably mounted to the feed module housing 31 and forming a second pair of locking elements, wherein the third locking element 71c is moveable into locking engagement with a male-shaped coupling member 60 received in a third female-shaped coupling member 70c and the fourth locking element 71d is moveable into locking engagement with a male-shaped coupling member 60 received in a fourth female-shaped coupling member 70d;

an operating shaft 72 rotatably mounted to the feed module housing 31;

a first wedge member 73 designed for engagement with an inclined guide surface 75a, 75b (see FIG. 23) on each locking element 71a, 71b of the first pair of locking elements; and a second wedge member 74 designed for engagement with an inclined guide surface 75c, 75d on each locking element 71c, 71d of the second pair of locking elements.

The operating shaft 72 is rotatable in relation to the feed module housing 31 but axially fixed in relation to the feed module housing 31, i.e. prevented from moving in its axial direction in relation to the feed module housing 31.

The first wedge member 73 has an internal thread 76a (see FIG. 23) that is in engagement with a first external thread 77a on the operating shaft 72, and the second wedge member 74 has an internal thread 76b that is in engagement with a second external thread 77b on the operating shaft 72. The first and second external threads 77a, 77b on the operating shaft 72 are threaded in opposite directions. Furthermore, the wedge members 73, 74 are prevented from rotating in relation to the feed module housing 31, for instance by means of guide members 78 (see FIG. 25) which are fixed to the feed module housing 31 and received in axial guide grooves 79 in the wedge members 73, 74. Thus, the wedge members 73, 74 are moveable along the operating shaft 72 away from each other by rotation of the operating shaft 72 in one rotary direction and towards each other by rotation of the operating shaft 72 in the opposite rotary direction.

The locking elements 71a-71d are moveable under the effect of the first and second wedge members 73, 74 from a retracted unlocking position (see FIGS. 6 and 21), in which the male-shaped coupling members 60 are moveable into and out of engagement with the female-shaped coupling members 70a-70d, to an advanced locking position (see FIGS. 8, 22 and 23), in which the locking elements 71a-71d are in locking engagement with the male-shaped coupling members 60 and thereby keep the male-shaped coupling members 60 secured to the female-shaped coupling members 70a-70d. The first and second wedge members 73, 74 are moveable along the operating shaft 72 in a first direction in relation to each other by rotation of the operating shaft 72 in a first rotary direction in order to move the locking elements 71a-71d from the unlocking position to the locking position, and in an opposite second direction in relation to each other by rotation of the operating shaft 72 in a second rotary direction in order to allow the locking elements 71a-71d to move from the locking position to the unlocking position. In the illustrated example, the first and second wedge members 73, 74 are configured to move away from each other when the operating shaft 72 is rotated in said first rotary direction and towards each other when the operating shaft 72 is rotated in said second rotary direction.

In the illustrated embodiment, each locking element 71a-71d is slidably mounted to the feed module housing 31 so as to be axially slidable between the unlocking position and the locking position, wherein the first and second locking elements 71a, 71b are arranged in alignment with each other on opposite sides of the first wedge member 73 and the third and fourth locking elements 71c, 71d are arranged in alignment with each other on opposite sides of the second wedge member 74. In this case, an inclined first wedge surface 73a (see FIG. 23) on a first side of the first wedge member 73 is configured for slidable engagement with the inclined guide surface 75a on the first locking element 71a, and an inclined second wedge surface 73b on an opposite second side of the first wedge member 73 is configured for slidable engagement with the inclined guide surface 75b on the second locking element 71a. In a corresponding manner, an inclined first wedge surface 74a on a first side of the second wedge member 74 is configured for slidable engagement with the inclined guide surface 75c on the third locking element 71c, and an inclined second wedge surface 74b on an opposite second side of the second wedge member 74 is configured for slidable engagement with the inclined guide surface 75d on the fourth locking element 71d.

The first and second locking elements 71a, 71b are moveable in relation to each other from the unlocking position to the locking position against the action of the spring force from at least one first spring member 80 (see FIGS. 16 and 25), wherein the first and second locking elements 71a, 71b are configured to move from the locking position to the unlocking position under the effect of the spring force from said at least one first spring member 80 when the first and second wedge members 73, 74 are moved in said second direction in relation to each other. In the illustrated embodiment, there is only one first spring member 80, which has the form of a tension coil spring and which at a first end is fixed to the first locking element 71a and at an opposite second end is fixed to the second locking element 71b.

The third and fourth locking elements 71c, 71d are moveable in relation to each other from the unlocking position to the locking position against the action of the spring force from at least one second spring member 81, wherein the third and fourth locking elements 71c, 71d are configured to move from the locking position to the unlocking position under the effect of the spring force from said at least one second spring member 81 when the first and second wedge members 73, 74 are moved in said second direction in relation to each other. In the illustrated embodiment, there is only one second spring member 81, which has the form of a tension coil spring and which at a first end is fixed to the third locking element 71c and at an opposite second end is fixed to the fourth locking element 71d.

Figure 13:
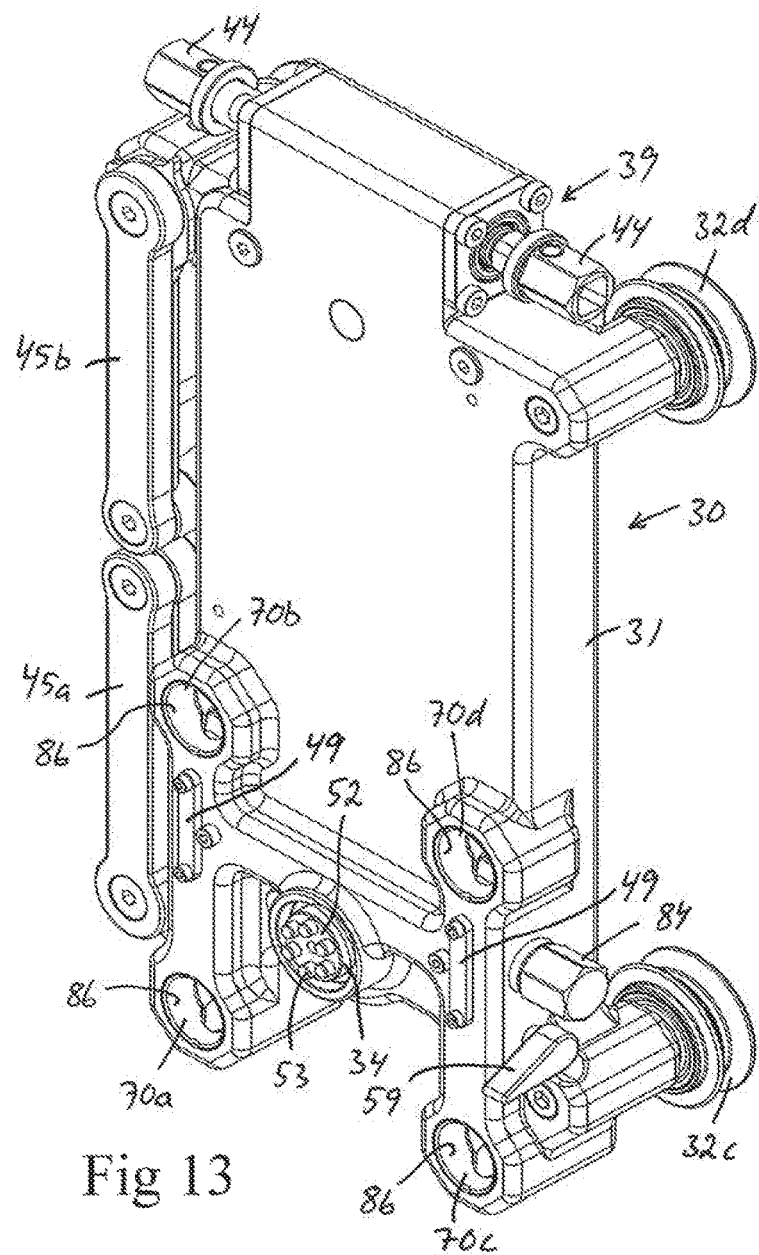
Figure 14:
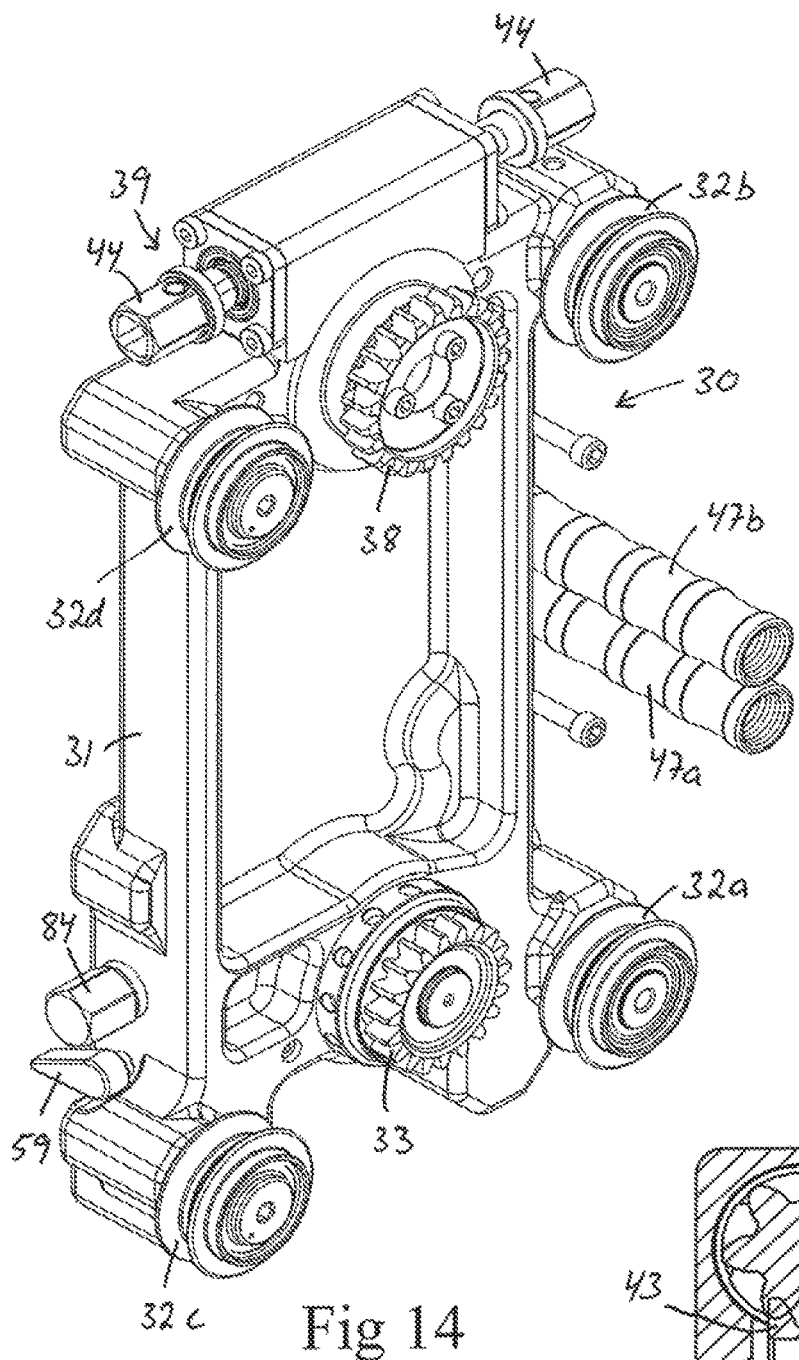
Figure 15:
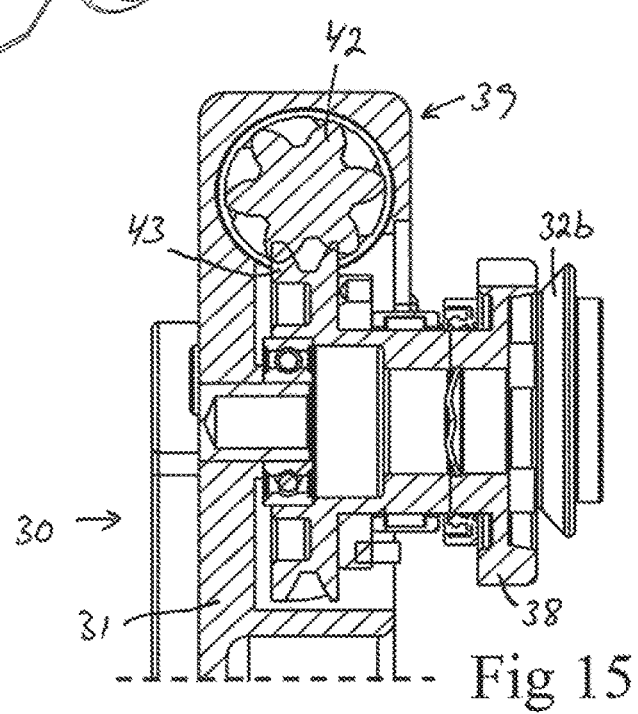
FIG. 15 is a cut through a manually operated drive mechanism included in the feed module.

In the illustrated embodiment, the first and second spring members 80, 81 are received in a respective recess in the feed module housing 31, wherein each recess is covered by an elongated cover plate 49 (see FIG. 13). The cover plates 49 have been omitted in FIG. 16.

Each locking element 71a-71d is with advantage provided with a wedge surface 82 (see FIG. 6) configured for engagement with a corresponding wedge surface 62 on the male-shaped coupling members 60, wherein the drive unit housing 11 is configured to be tightened to the feed module housing 31 under the effect of these mutually co-operating wedge surfaces 62, 82 when the locking elements 71a-71d are pushed towards the male-shaped coupling members 60 under the effect of the wedge members 73, 74.

In the illustrated embodiment, each locking element 71a-71d is provided with a protruding locking member 83 (see FIGS. 6 and 25) configured for locking engagement with a corresponding locking member 63 in the form of a recess or circumferential groove on one of the male-shaped coupling members 60. Each locking element 71a-71d has an inner end facing the operating shaft 72 and an opposite outer end, wherein the inclined guide surface 75a-75d of the locking element is provided at the inner end of the locking element and the protruding locking member 83 of the locking element is formed as a tip at the outer end of the locking element.

A socket 84 designed for releasable engagement with a torque tool (not shown) is fixed to the operating shaft 72 at one end thereof so as to allow a torque tool, for instance in the form of a box spanner or the similar, to be connected to the operating shaft 72 when the operating shaft is to be rotated in order to move the locking elements 71a-71d between the unlocking and locking positions.

Figure 25:
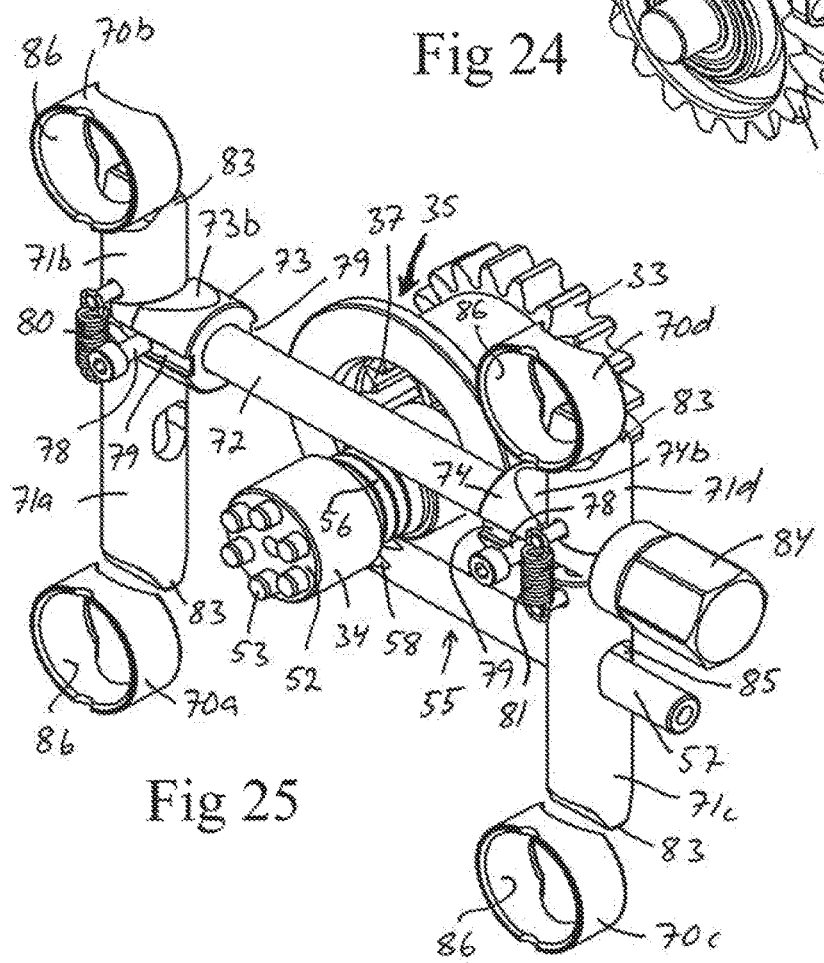
FIG. 25 is a perspective view of parts included in the feed module.

In the illustrated embodiment, the shaft 57 of the manoeuvring member 55 extends through a transverse hole 85 in the third locking element 71c, as illustrated in FIG. 25. The transverse hole 85 is oval in order to allow the third locking element 71c to move a short distance in its longitudinal direction in relation to the shaft 57 when being moved between the unlocking and locking positions.

Each female-shaped coupling member 70a-70d preferably has a cone-shaped internal surface 86 (see FIGS. 6, 13 and 25) configured for engagement with a corresponding cone-shaped external surface 66 on the male-shaped coupling members 60 in order to facilitate an insertion of the male-shaped coupling members 60 into the female-shaped coupling members 70a-70d and ensure a correct positioning of the drive unit housing 11 in relation to the feed module housing 31.

Figure 2:
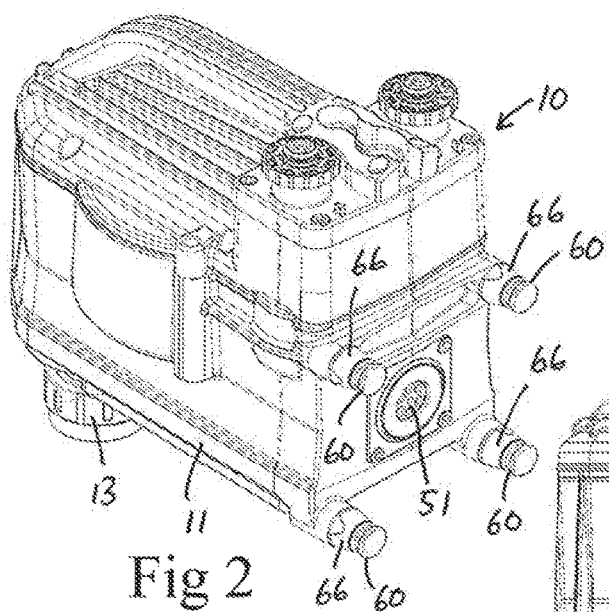
FIG. 2 is a perspective view of a drive unit included in the machining assembly of FIG. 1.
Figure 3:
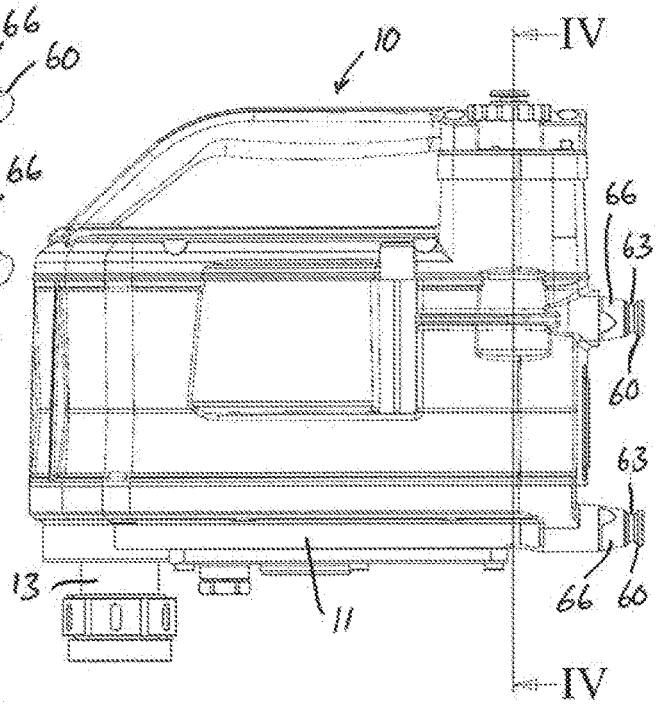
FIG. 3 is a lateral view of the drive unit of FIG. 2.
Figure 16:
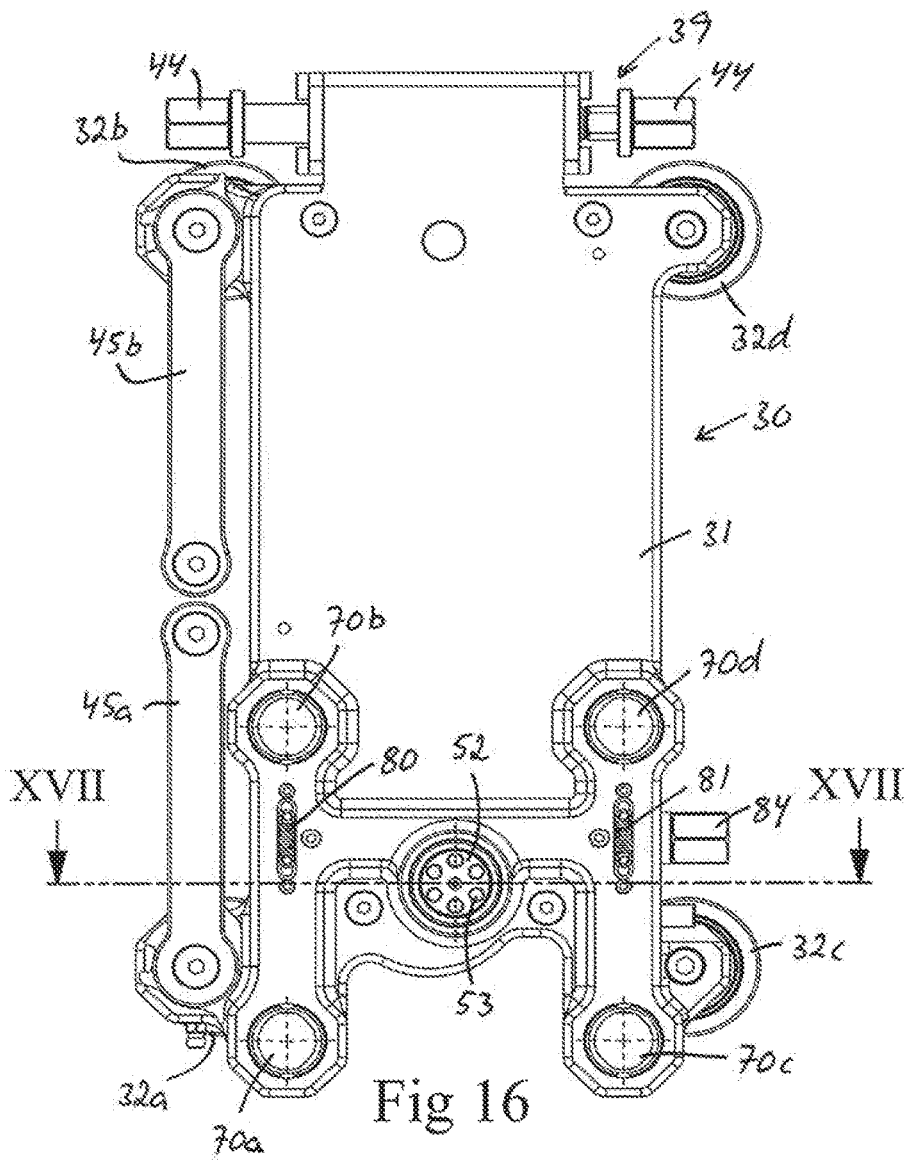
FIG. 16 is a front view of the feed module.

The male-shaped coupling members 60 are with advantage positioned on the drive unit housing 11 in a square, as illustrated in FIG. 2, wherein the female-shaped coupling members 70a-70d are positioned on the feed module housing 31 in a corresponding square, as illustrated in FIGS. 13 and 16, to thereby allow the drive unit 10 to be secured to the feed module 30 in four different rotational positions in relation to the feed module.

As an alternative to the illustrated embodiment, the machining assembly 1 of the present invention may of course be provided with any other suitable type of coupling device for detachably securing the drive unit housing 11 to the feed module housing 31.

The invention is of course not in any way restricted to the embodiments described above. On the contrary, many possibilities to modifications thereof will be apparent to a person with ordinary skill in the art without departing from the basic idea of the invention as defined in the appended claims.

The invention claimed is:

1. A machining assembly comprising a drive unit (10), a feed module (30) and a machine stand (2) for supporting the feed module and the drive unit, the drive unit (10) being detachably mountable to the feed module (30) to allow the drive unit to be moved along a guide track (5) on the machine stand (2) via the feed module, wherein
the drive unit (10) comprises:
a drive unit housing (11),
a first electric motor (12) arranged in the drive unit housing (11),
a spindle (13) configured for connection to a machining tool, the spindle being rotatably mounted to the drive unit housing (11), and
a first transmission mechanism (15) arranged in the drive unit housing (11) for transmitting torque from the first electric motor (12) to the spindle (13) so as to allow the spindle to be rotated by the first electric motor (12);
the feed module (30) comprises:
a feed module housing (31),
guide members (32a-32d), which are mounted to the feed module housing (31) and configured for engagement with said guide track (5), and
a feed gear wheel (33), which is rotatably mounted to the feed module housing (31) and configured for engagement with a cog track (6) arranged on the machine stand (2) in parallel with said guide track (5) to allow the feed module (30) to move along the guide track by rotation of the feed gear wheel;
the drive unit (10) comprises a second electric motor (16) arranged in the drive unit housing (11), a drive member (17) rotatably mounted to the drive unit housing (11) and a second transmission mechanism (18) arranged in the drive unit housing (11) for transmitting torque from the second electric motor (16) to the drive member (17) to allow the drive member to be rotated by the second electric motor (16);
the feed module (30) comprises a rotatable member (34), which is rotatably mounted to the feed module housing (31) and configured to be connected to said drive member (17) of the drive unit (10) by a torque transmitting coupling mechanism (50) when the drive unit (10) is mounted to the feed module (30); and
the rotatable member (34) is operatively connected to the feed gear wheel (33) to allow torque to be transmitted from the second electric motor (16) to the feed gear wheel (33) via the drive member (17) of the drive unit (10) and the rotatable member (34) of the feed module (30), and thereby allow the feed gear wheel (33) to be rotated by the second electric motor (16), when the drive unit (10) is mounted to the feed module (30).

2. The machining assembly according to claim 1, wherein the second transmission mechanism (18) comprises a worm gear arrangement with a worm screw (19) and a worm wheel (20);
the worm screw (19) is operatively connected to an output shaft (22) of the second electric motor (16) to allow the worm screw to be driven in rotation by the second electric motor; and
the worm wheel (20) is in engagement with the worm screw (19) and non-rotatably connected to the drive member (17).

3. The machining assembly according to claim 2, wherein the second transmission mechanism (18) also comprises a reduction gear (23), and the worm screw (19) is operatively connected to the output shaft (22) of the second electric motor (16) via this reduction gear (23).

4. The machining assembly according to claim 3, wherein the reduction gear (23) is a planetary gear.

5. The machining assembly according to claim 1, wherein the feed module (30) comprises a third transmission mechanism (35) for transmitting torque from the rotatable member (34) to the feed gear wheel (33), the third transmission mechanism (35) being arranged in the feed module housing (31).

6. The machining assembly according to claim 5, wherein
the rotatable member (34) is rotatable about a first axis of rotation (A1);
the feed gear wheel (33) is rotatable about a second axis of rotation (A2) which extends in parallel with the first axis of rotation (A1);
the third transmission mechanism (35) comprises a first gear wheel (36) which is non-rotatably connected to the rotatable member (34) and a second gear wheel (37) which is non-rotatably connected to the feed gear wheel (33); and
the first gear wheel (36), directly or via one or more intermediate gear wheels, is in driving engagement with the second gear wheel (37) so that the feed gear wheel (33) is configured to rotate about the second axis of rotation (A2) via the first and second gear wheels (36, 37) when the rotatable member (34) is rotated about the first axis of rotation (A1).

7. The machining assembly according to claim 6, wherein said second gear wheel (37) is an internally toothed ring gear, wherein said first gear wheel (36) is an externally toothed gear wheel which is in direct engagement with the second gear wheel (37).

8. The machining assembly according to claim 1, wherein the torque transmitting coupling mechanism (50) has the form of a clutch with a first clutch part (51) non-rotatably connected to the drive member (17) of the drive unit (10) and a second clutch part (52) non-rotatably connected to the rotatable member (34) of the feed module (30).

9. The machining assembly according to claim 8, wherein
the second clutch part (52) is moveable in relation to the feed module housing (31) between an advanced position, in which the second clutch part (52) is in torque-transmitting engagement with the first clutch part (51), and a retracted position, in which the second clutch part (52) is disengaged from the first clutch part (51); and
the feed module (30) is provided with a manually manoeuvrable manoeuvring member (55) for moving the second clutch part (52) between the advanced and retracted positions.

10. The machining assembly according to claim 9, wherein
a clutch manoeuvring worm screw (56) is non-rotatably connected to the second clutch part (52);
said manoeuvring member (55) comprises a shaft (57) which is rotatably mounted to the feed module housing (31) to be manually rotatable; and the shaft (57) is provided with a worm gear (58) which is in engagement with the clutch manoeuvring worm screw (56) to allow the second clutch part (52) to be moved from the advanced position to the retracted positions by rotation of the shaft (57) in a first rotary direction and from the retracted position to the advanced position by rotation of the shaft (57) in an opposite rotary direction.

11. The machining assembly according to claim 1, wherein
said feed gear wheel (33) constitutes a first feed gear wheel of the feed module (30);
the feed module (30) also comprises a second feed gear wheel (38), which is rotatably mounted to the feed module housing (31) and configured for engagement with the cog track (6) on the machine stand (2) to allow the feed module (30) to move along the guide track (5) by rotation of the second feed gear wheel (38); and
the feed module (30) comprises a manually operated drive mechanism (39), which is operatively connected to the second feed gear wheel (38) to allow torque to be transmitted from the manually operated drive mechanism (39) to the second feed gear wheel (38) and thereby allow the second feed gear wheel to be rotated by the manually operated drive mechanism.

12. The machining assembly according to claim 11, wherein the manually operated drive mechanism (39) comprises a drive shaft (40) rotatably mounted to the feed module housing (31) and a helical gear wheel (42) non-rotatably fixed to the drive shaft (40), and said helical gear wheel (42) is in engagement with a corresponding helical gear wheel (43) which is non-rotatably connected to the second feed gear wheel (38).

13. The machining assembly according to claim 1, wherein
the machining assembly (1) comprises a coupling device for detachably securing the drive unit (10) to the feed module (30), the coupling device comprising:
four male-shaped coupling members (60) fixed to the drive unit housing (11);
four female-shaped coupling members (70a-70d) fixed to the feed module housing (31) and configured for engagement with a respective one of the male-shaped coupling members (60);
first and second locking elements (71a-71d) moveably mounted to the feed module housing (31) and forming a first pair of locking elements;
the first locking element (71a) is moveable into locking engagement with a first male-shaped coupling member (60) of the four male-shaped coupling members (60), received in a first female-shaped coupling member (70a) of the four female-shaped coupling members (70a-70d), and the second locking element (71b) is moveable into locking engagement with a second male-shaped coupling member (60) of the four male-shaped coupling members (60), received in a second female-shaped coupling member (70b) of the four female-shaped coupling members (70a-70d);
third and fourth locking elements (70c, 70d) moveably mounted to the feed module housing (31) and forming a second pair of locking elements;
the third locking element (71c) is moveable into locking engagement with a third male-shaped coupling member (60) of the four male-shaped coupling members (60), received in a third female-shaped coupling member (70c) of the four female-shaped coupling members (70a-70d), and the fourth locking element (71d) is moveable into locking engagement with a fourth male-shaped coupling member (60) of the four male-shaped coupling members (60), received in a fourth female-shaped coupling member (70d) of the four female-shaped coupling members (70a-70d);
an operating shaft (72) rotatably mounted to the feed module housing (31);
a first wedge member (73) configured for engagement with an inclined guide surface (75a, 75b) on each locking element (71a, 71b) of the first pair of locking elements, the first wedge member (73) having an internal thread (76a) that is in engagement with a first external thread (77a) on the operating shaft (72);
a second wedge member (74) configured for engagement with an inclined guide surface (75c, 75d) on each locking element (71c, 71d) of the second pair of locking elements, the second wedge member (74) having an internal thread (76b) that is in engagement with a second external thread (77b) on the operating shaft (72);
each of the locking elements (71a-71d) is moveable by the first and second wedge members (73, 74) from a retracted unlocking position, in which each of the four male-shaped coupling members (60) is arc moveable into and out of engagement with each of the four female-shaped coupling members (70a-70d), to an advanced locking position, in which each of the locking elements (71a-71d) is arc in locking engagement with each of the four male-shaped coupling members (60) and thereby keeps each of the four male-shaped coupling members (60) secured to each of the four female-shaped coupling members (70a-70d);
said first and second external threads (77a, 77b) on the operating shaft (72) are threaded in opposite directions; and
the first and second wedge members (73, 74) are moveable along the operating shaft (72) in a first direction in relation to each other by rotation of the operating shaft (72) in a first rotary direction in order to move the locking elements (71a-71d) from the unlocking position to the locking position, and in an opposite second direction in relation to each other by rotation of the operating shaft (72) in a second rotary direction to allow the locking elements (71a-71d) to move from the locking position to the unlocking position.

14. The machining assembly according to claim 13, wherein
the first and second locking elements (71a, 71b) are moveable in relation to each other from the unlocking position to the locking position against a spring force action from at least one first spring member (80);
the first and second locking elements (71a, 71b) are configured to move from the locking position to the unlocking position by the spring force action from said at least one first spring member (80) when the first and second wedge members (73, 74) are moved in said second direction in relation to each other;
the third and fourth locking elements (71c, 71d) are moveable in relation to each other from the unlocking position to the locking position against a spring force action from at least one second spring member (81); and the third and fourth locking elements (71c, 71d) are configured to move from the locking position to the unlocking position by the spring force action from said at least one second spring member (81) when the first and second wedge members (71c, 71d) are moved in said second direction in relation to each other.

15. The machining assembly according to claim 13, wherein the four male-shaped coupling members (60) are positioned on the drive unit housing (11) in a square, and the four female-shaped coupling members (70a-70d) are positioned on the feed module housing (31) in a corresponding square, to thereby allow the drive unit (10) to be secured to the feed module (30) in four different rotational positions in relation to the feed module.

16. The machining assembly according to claim 4, wherein the feed module (30) comprises a third transmission mechanism (35) for transmitting torque from the rotatable member (34) to the feed gear wheel (33), the third transmission mechanism (35) being arranged in the feed module housing (31).

17. The machining assembly according to claim 3, wherein the feed module (30) comprises a third transmission mechanism (35) for transmitting torque from the rotatable member (34) to the feed gear wheel (33), the third transmission mechanism (35) being arranged in the feed module housing (31).

18. The machining assembly according to claim 2, wherein the feed module (30) comprises a third transmission mechanism (35) for transmitting torque from the rotatable member (34) to the feed gear wheel (33), the third transmission mechanism (35) being arranged in the feed module housing (31).

19. The machining assembly according to claim 16, wherein the rotatable member (34) is rotatable about a first axis of rotation (A1);

the feed gear wheel (33) is rotatable about a second axis of rotation (A2) which extends in parallel with the first axis of rotation (A1);

the third transmission mechanism (35) comprises a first gear wheel (36) which is non-rotatably connected to the rotatable member (34) and a second gear wheel (37) which is non-rotatably connected to the feed gear wheel (33); and the first gear wheel (36), directly or via one or more intermediate gear wheels, is in driving engagement with the second gear wheel (37) so that the feed gear wheel (33) is made to rotate about the second axis of rotation (A2) via these gear wheels (36, 37) when the rotatable member (34) is rotated about the first axis of rotation (A1).

20. The machining assembly according to claim 17, wherein the rotatable member (34) is rotatable about a first axis of rotation (A1);

the feed gear wheel (33) is rotatable about a second axis of rotation (A2) which extends in parallel with the first axis of rotation (A1);

the third transmission mechanism (35) comprises a first gear wheel (36) which is non-rotatably connected to the rotatable member (34) and a second gear wheel (37) which is non-rotatably connected to the feed gear wheel (33); and the first gear wheel (36), directly or via one or more intermediate gear wheels, is in driving engagement with the second gear wheel (37) so that the feed gear wheel (33) is made to rotate about the second axis of rotation (A2) via these gear wheels (36, 37) when the rotatable member (34) is rotated about the first axis of rotation (A1).

* * * * *